United States Patent
Andell et al.

(10) Patent No.: US 6,225,423 B1
(45) Date of Patent: May 1, 2001

(54) OLEFIN POLYMERIZATION CATALYST SYSTEM, PRODUCING AND USING IT

(75) Inventors: Ove S. Andell, Merikorttitie; Harri Hokkanen, Ketokiventie; Marja Mustonen, Riistatie, all of (FI)

(73) Assignee: Borealis Technolgy Oy, Porvoo (FI)

( * ) Notice: Subject to any disclaimer, the term of this patent is extended or adjusted under 35 U.S.C. 154(b) by 0 days.

(21) Appl. No.: 09/101,869

(22) PCT Filed: Jan. 24, 1997

(86) PCT No.: PCT/FI97/00034

§ 371 Date: Sep. 21, 1998

§ 102(e) Date: Sep. 21, 1998

(87) PCT Pub. No.: WO97/27224

PCT Pub. Date: Jul. 31, 1997

(30) Foreign Application Priority Data

Jan. 26, 1996 (FI) ...................................................... 960363

(51) Int. Cl.⁷ ................ C08F 4/44; B10J 31/38
(52) U.S. Cl. ................ 526/75; 526/89; 526/160; 526/943; 502/104; 502/117; 502/152
(58) Field of Search ..................... 526/160, 161, 526/75, 89, 943; 502/104, 117, 152; 556/53

(56) References Cited

U.S. PATENT DOCUMENTS

| | | |
|---|---|---|
| 5,347,024 | 9/1994 | Nickias et al. . |
| 5,416,179 | 5/1995 | Welch et al. . |

FOREIGN PATENT DOCUMENTS

| | | |
|---|---|---|
| 4242486A1 | 6/1994 | (DE) . |
| 0354893A2 | 2/1990 | (EP) . |
| 20-354893 | 2/1990 | (EP) . |
| 2-0519236 | 12/1992 | (EP) . |
| 2-0523416 | 1/1993 | (EP) . |
| 1-0545152 | 6/1993 | (EP) . |
| 1-0567952 | 11/1993 | (EP) . |
| 1-0586167 | 3/1994 | (EP) . |
| 23588277 | 3/1994 | (EP) . |
| 1-0650973 | 5/1995 | (EP) . |
| 1-0659756 | 6/1995 | (EP) . |
| 8806056 | 7/1990 | (FI) . |
| 8903621 | 1/1991 | (FI) . |
| 9100523 | 8/1991 | (FI) . |
| 9501347 | 9/1995 | (FI) . |
| 2-154242 | 9/1985 | (GB) . |
| WO 8702991 | 5/1987 | (WO) . |
| WO 9205208 | 4/1992 | (WO) . |
| WO 9323439 | 11/1993 | (WO) . |
| WO 9403506 | 2/1994 | (WO) . |
| 9428034 | 12/1994 | (WO) . |
| WO 9500562 | 1/1995 | (WO) . |
| WO 9504761 | 2/1995 | (WO) . |
| WO 9510542 | 4/1995 | (WO) . |
| WO 9514044 | 5/1995 | (WO) . |

OTHER PUBLICATIONS

Reddy et al., Prog. Polym. Sci., vol. 2, 309–367, 1995.

Primary Examiner—David W. Wu
Assistant Examiner—R. Harlan
(74) Attorney, Agent, or Firm—Birch, Stewart, Kolasch & Birch, LLP

(57) ABSTRACT

The invention relates to a novel olefin polymerization catalyst system comprising a reaction product of a transition metal compound. A stable and active single active site catalyst is obtained by producing said reaction product by:

(I) contacting in an organic solvent the following reactive components (a) a transition metal compound, which is at least partially soluble in the organic solvent and contains in its molecule at least one organic group and a transition metal chosen from periods 4–7 and groups 3–10 of the Periodic Table (IUPAC 1990), and (b) 0.05–500 moles of an unsaturated organic compound per mole of transition metal of the transition metal compound, which unsaturated organic compound is at least partially soluble in the organic solvent, has in its molecule 2–30 carbon atoms and at least one terminal double bond, to obtain a reaction product dissolved in the organic solvent; and (II) recovering the reaction product of the transition metal compound.

35 Claims, No Drawings

OLEFIN POLYMERIZATION CATALYST SYSTEM, PRODUCING AND USING IT

This application is the national phase under 35 U.S.C. §371 of prior PCT International Application No. PCT/FI97/00034 which has an International filing date of Jan. 24, 1997 which designated the United States of America, the entire contents of which are hereby incorporated by reference.

The invention relates to an olefin polymerization catalyst system comprising a reaction product of a transition metal compound. The invention also relates to a process for the polymerization of olefins by polymerizing one or more olefins, using an olefin polymerization catalyst system that comprises a reaction product of a transition metal compound. The invention relates also to a process for producing the transition metal compound's reaction product for the olefin polymerization catalyst system.

Ethylenically unsaturated monomers, especially olefins, are commonly polymerized by systems called Ziegler-Natta catalyst systems. These catalyst systems comprise a transition metal compound and most often an organometallic compound which functions synergetically with the transition metal compound, and often also one or more electron donors.

The Ziegler-Natta catalyst systems can be divided according to their physical states, into heterogenous and homogenous catalyst systems. The heterogenous Ziegler-Natta catalyst systems are solid catalysts with or without carrier. The homogenous Ziegler-Natta catalyst systems are catalyst systems that function in solution.

In catalyst systems based on alkyl aluminium cocatalysts, the transition metal component is usually based on titanium, vanadinium, chromium or nickel. Thus homogenous catalyst systems based on chromium are used, among other things, for the polymerization of dienes. Homogenous catalyst systems based on nickel are suitable for the oligomerization of ethylene. α-olefins have been polymerized using metallocene-type and vanadinium-based catalyst systems, where alkyl aluminium compounds have functioned as cocatalysts.

There are catalyst systems known in the art, which are based on vanadinium and wherein a vanadinium compound, combined with an alkyl aluminium compound, has been used as a catalyst system for polymerizing propene. Such catalyst systems have also been utilized for homopolymerizing higher α-olefins and copolymerizing higher α-olefins with ethylene.

Homogenous Ziegler-Natta catalyst systems based on metallocenes form a group of their own in the art. They usually comprise a π-cyclopentadiene complex of a transition metal, such as titanium or zirconium, and a synergistically functioning organoaluminium complex, such as alkyl aluminium or aluminium oxane (aluminoxane, alumoxane), which is a reaction product of alkyl aluminium and water. Characteristic to these homogenous catalyst systems is a medium polymerizing activity, a narrow molecular weight distribution of the polymer product and that the activity of the catalyst systems is rapidly lost. The deactivation of the catalyst system has been studied using kinetic and spectroscopic methods. It was possible to demonstrate that the part that was active in the polymerization of ethylene comprised the transition metal in oxidation state +IV. The short life time of the active part is thought to be due to rapid deactivation processes, such as alkyl exchange, hydrogen exchange reaction and reduction reactions. See S. S. Reddy and S. Siwaram, *Prog. Polym. Sci.* 20 (1995), 313.

The newest group of homogenous Ziegler-Natta catalyst systems in the art is based on cationic metallocenes. As ligand there is usually a cyclopentadienyl or its derivative, and the metal is usually titanium or zirconium, and the compound comprises an aluminium-free pair of ions that functions as the active centre of the polymerization. The polymerizing activity of this type of cationic metallocenes is usually medium or low.

An important characteristic of homogenous catalyst systems, i.e., catalyst systems that function in solution, is that in them, all the active centres or catalysts are similar i.e. the catalyst is a single-site one. Thus the polymerization forms macromolecules of various lengths according to a narrow distribution called the Schultz-Flory distribution. These single site catalyst systems are often layered on a carrier to improve the morphology of the polymer obtained and to facilitate the feeding of the catalyst into the polymerization reactor. Since the morphology of the catalyst repeats itself in the polymer (replica phenomen), a polymer with a Schultz-Flory molecular weight distribution and with a favourable morphology is obtained as a result.

As mentioned above, previous homogenous catalyst often have the impediments of low or medium activity and a very short active life. The present invention intends to remove these impediments. It is known to treat Ziegler-Natta catalyst systems with an olefin before they are fed into the polymerization reactor.

The dry and prepared catalyst, impregnated according to a known process, is treated with an olefin before it is fed into the reactor, to provide a more controlled initial activity for the catalyst system and thus prevent uncontrolled local exotermic polymerization reaction. The presence of an olefin leads to a process called prepolymerization and it can be carried out either in reactors located prior to the actual polymerization reactor or in the actual polymerization reactor. The prepolymerization is usually carried out until the catalyst particle is decomposed and the size of the prepolymerization particle thus formed is manyfold in comparison with the original catalyst particle. This type of prepolymerization can also be carried out in order to retain the essential chemicals in a solid catalyst particle.

The publication WO 94/28034 proposes a process of this type, in which methylalumoxane, di-methylsilane-diyl-bis-(2-methyl-4,5-benzo-indenyl)zirconiumdichloride and dehydrated silica are brought into contact in toluene, after which the toluene is removed by evaporation, and the ethylene is prepolymerized in an isopentane medium, using the solid catalyst system obtained. Using the prepolymerized solid catalyst system obtained, the actual polymerization is then carried out using propene with triethylaluminium as cocatalyst.

According to another process, the homogenous catalyst system is transformed into a heterogenous one by prepolymerizing a homogenous, single-site catalyst system in a solvent, in which case an insoluble polymer is produced, with which some catalytically active material is precipitated. This catalyst system precipitated during the prepolymerization is subsequently used for the actual polymerization.

Specification EP-A2-0 354 893 proposes a precipitating prepolymerization, wherein a toluene solution of a metallocene and aluminoxane is fed into a polymerization reactor, after which propene is added and the catalyst system is allowed to prepolymerize for five minutes. After that an actual propene polymerization is carried out with the solid prepolymer obtained. The reaction time is about ½–4 hours. Specification EP-A2-0 519 236 proposes bringing into contact dicyclopentadienyl zirconium chloride and methyl aluminoxane in a toluene solution. Heptane and a viscosity-enhancing polymer are then added to suspend the catalyst system, after which ethylene is added in order to carry out a prepolymerization. Finally, the prepolymer is separated from the suspension, and used in a normal ethylene polymerization.

A third way to transform a homogenous single-site catalyst system into a heterogenous, but still single-site system, has been proposed in U.S. Pat. No. 5,416,179. In this process, methyl aluminoxane is precipitated by adding hexane to a toluene solution thereof. The prepicitated methyl aluminoxane and bis(n-butyl-cyclopentadienyl) zirconiumdichloride are suspended in hexane, after which the product is filtered and dried. The catalyst system obtained is then added into the polymerization reactor together with isobutene and ethylene monomers. According to the specification, adding isobutene comonomer increases the ethylene polymerization activity of the catalyst.

The intention of the heterogenization of the homogenous catalyst systems mentioned has been to obtain solid catalysts which have single-site active centres and are also stable, have advantageous particle shape and are sufficiently active.

In a first case in which a homogenous catalyst system is used there is the disadvantage of a rapid loss of the catalytic activity.

In a second case where the carrier particles are coated with dissolved catalyst components, e.g., with metallocene and aluminium compounds, and prepolymerization is carried out with the coated particles, the end product is one with the carrier particles surrounded by a catalyst layer and the catalyst layer at least partly surrounded by a prepolymer layer. This structure has the right particle constitution, i.e. morphology, and its catalyst component is stabilized by the prepolymer, but the outermost polymer layer covers the catalyst components and thus impedes the polymerization. The right morphology and stability have thus been achieved at the cost of activity.

In a third case, the solidification of a homogenous catalyst system is carried out by prepolymerizing a monomer and a catalyst up to the point of precipitation or by precipitating the prepolymer. This way, the prepolymer stabilizes the catalyst system and the catalyst molecules are easier to reach by the monomers and the growing polymer chains than in the previous case, but the spontaneous precipitation of the prepolymer makes it impossible to design exactly the morphology of particles that are formed.

A fourth case, in which the methyl aluminoxane is precipitated, its particles are brought to react with metallocene and the catalyst system obtained is prepolymerized, actually involves the two disadvantages of the two systems mentioned above. The advantage of this system is that the catalyst system is stabilized by the prepolymerization, but the spontaneous precipitation of the methyl aluminium oxane results in a poor morphology, and coating the particles with a polymer layer impedes the physical contact between the particles, the growing polymer chains and the monomers, and thus lowers the activity of the catalyst system.

The present invention intends to produce a new catalyst system, in which the following properties are combined. Firstly, the catalyst system of the invention involves the design of only one type of active centres, which thus leads to a Schulz-Flory distribution.

Since the activity of a single site active centre catalyst system rapidly decreases when stored, the present invention intends to produce as stable a catalyst system as possible. This concerns both homogenous and heterogenous single site catalyst systems.

Since the particle size and shape of a heterogenous catalyst system reapeats itself in a polymer product, it is also the intention of the present invention to produce a solid catalyst system with an advantageous morphology for heterogenous single-site catalyst systems.

Concurrently, it is attempted to produce a catalyst system as active as possible by physical and chemical means.

The above-mentioned objectives of the invention have now been accomplished mainly so that the olefin polymerizing catalyst system comprises a reaction product of a transition metal compound that has been obtained in a process which involves the following successive phases:

(I) contacting with each other the following reactive components in an organic solvent:
   (a) a transition metal compound which is at least partially soluble in the organic solvent and contains in its molecule at least one organic group and a transition metal chosen from periods 4–7 and groups 3–10 of the Periodic Table (IUPAC 1990), and
   (b) 0.05–500 moles of an unsaturated organic compound per mole of transition metal of the transition metal compound, which unsaturated organic compound is at least partially soluble in the organic solvent mentioned, and has in its molecule 2–30 carbon atoms and at least one double bond, to obtain a reaction product dissolved in the organic solvent; and (II) recovering the reaction product of the transition metal compound.

Thus it has been discovered that by contacting a homogenous catalyst system in a solution and a lower amount of an unsaturated organic compound than the amount used in prepolymerization, the product thus obtained is both stable as well as accessible to the growing polymer chain and the monomers and thus active. The stabilized catalytic solution thus obtained is suitable for both homogenous and heterogenous catalyst systems.

It is known, for example, that there have been difficulties in getting a sufficient portion of the homogenous catalyst system of the solution into the form of a complex that has polymerization activity. See Jüngling, S. and Müllhaupt, R., *J. Organometal. Chem.*, 497 (1995) 27–32. Thus reacting the catalyst system with a small amount of an organic compound having at least one terminal double bond increases the portion of the complex having polymerization activity in the homogenous catalyst system. Because the molar ratio between the unsaturated organic compound and the transition metal of the transition metal compound is lower than in a conventional prepolymerization, it is to be supposed that the unsaturated organic compound mainly reacts with the active centres of the catalyst system, and polymerizes little or not at all.

Thus the present reaction product of the transition metal compound of the polymerization system can be characterized as a preinitiation product in contrast to prepolymerization products, in which an insoluble or precipitable mixture of the catalyst components and prepolymer is usually formed.

As mentioned, most homogenous catalysts and especially metallocenes activated by aluminium compounds or other cocatalysts involve the disadvantage that when they are stored in a solution or impregnated on a carrier, their activity decreases very quickly. An impregnating system in which the carrier is treated with a solution of the homogenous catalyst system can further decrease polymerization activity.

Preinitiating the homogenous catalyst system of the present invention with an unsaturated compound results in a product, on the active centre of which a protective group is attached. It stabilizes and protects the active centre against decomposing reactions that threaten it during the process of producing the catalyst system. To put it simply, a better way to activate and stabilize a catalyst system than conventional prepolymerization has been realized in the present invention.

Thus the polymerizing catalyst system of the invention involves a reaction product of a transition metal compound. The reaction product has been obtained by contacting the transition metal compound with an unsaturated organic compound in an organic solution. The organic compound comprises 2–30 carbon atoms and at least one terminal double bond.

In one embodiment, the unsaturated organic compound is a hydrocarbon which can either be linear or branched, cyclic or acyclic, aromatic or aliphatic. Olefins involved in this embodiment include, among others: ethylene, propylene, 1-butene, 1-pentene, 2-methyl-1-butene, 3-methyl-1-butene, 1-hexene, 2-methyl-1-pentene, 3-methyl-1-pentene, 4-methyl-1-pentene, 2-ethyl-1-butene, 2,3-dimethyl-1-butene, 3,3-dimethyl-1-butene, 1-heptene, 2-methyl-1-hexene, 3-methyl-1-hexene, 4-methyl-1-hexene, 5-methyl-1-hexene, 2-ethyl-1-pentene, 3-ethyl-1-pentene, 2,3-dimethyl-1-pentene, 2,4-dimethyl-1-pentene, 3,3-dimethyl-1-pentene, 3,4-dimethyl-1-pentene, 4,4-dimethyl-1-pentene, 3-methyl-1-ethyl-1-butene, 2,3,3-trimethyl-1-butene, 1-octene, 1-decene, etc., up to the compound 1-triacontene ($C_{30}$).

Cyclic alkanes and alkenes, including aromatic compounds like styrene, are also useful hydrocarbons. Especially preferable unsaturated organic compounds include sterically hindered compounds which are not able to homopolymerize or homopolymerize to such low molecular weight that the said reaction compound of the transition metal compound and the unsaturated organic compound is soluble in the said organic solvent. Unsaturated 3- or 4-branched cyclic or linear 1-alkenes, such as vinylcyclohexane, allylcyclohexane, 3,3-dimethyl-1-butene, 4,4-dimethyl-1-pentene, etc., are very preferable.

In another embodiment of the invention, the unsaturated organic compound reacting with a transition metal compound is a compound that includes a heteroatom. Preferable compounds with a heteroatom include 1-unsaturated silanes such as vinyltrimethylsilane, vinyltriethylsilane, vinyltriisopropylsilane, phenylvinyldimethylsilane, diphenylvinylmethylsilane, triphenylvinylsilane, tritolylvinylsilane, allyltrimethylsilane, allyldiethylmethylsilane, allyltriethylsilane, allyltriisopropylsilane, allylisobutylsilane, allyltriphenylsilane and allyltritolylsilane. Especially preferable 1-unsaturated silanes include vinyltrimethylsilane, allyltrimethylsilane, vinyltriethylsilane, allyltriethylsilane, vinyltriisopropylsilane, allyltriisopropylsilane, vinyltriphenylsilane and allyltriphenylsilane.

As mentioned above, in the present invention, a transition metal compound and an unsaturated organic compound react with each other in such a way, that notable polymerization cannot be considered to take place. This is further emphasized by the fact that a preferred molar ratio between the unsaturated organic compound and the transition metal of the transition metal compound is between 0.1 and 100, more preferably between 0.2 and 20 and most preferably between 1 and 10. In the last-mentioned range there is so little unsaturated organic compound per mole of transition metal compound, that the unsaturated organic compound cannot even theoretically be polymerized into a prepolymer. Nevertheless, it is by using these small amounts that a very notable improvement on activity is achieved.

"Solid reaction product obtained by reacting a transition metal compound with an unsaturated compound" discussed above refers to a case where the transition metal compound alone reacts with an unsaturated organic compound as well as to a case where the transition metal compound together with one or more reactive components reacts with an unsaturated organic compound. In one embodiment of the invention, the said reaction product is obtained during step (I) mentioned above by contacting in an organic solvent a transition metal compound (a) and an unsaturated organic compound (b), and also a component (c), which preferably is an organoaluminium compound soluble in said organic solvent.

The organoaluminium compound (c) depends on the transition metal compound used, because the invention relates to all olefin polymerization catalyst systems, in which the starting point is a soluble, in other words, homogenous, transition metal compound, and its accompanying active cocatalyst, in this case an organoaluminium compound. The organoaluminium compound (c) is, depending on which transition metal is used, preferably chosen from alkylaluminium compounds of the following general formula (I)

$$(R_mAlX_{3-m})n \tag{I}$$

or from soluble unmodified or modified aluminiumoxane compounds of the following general formula (II) or (III):

in which each R is independently a $C_1$–$C_4$-alkyl group, X is a halogen and m is 1, 2 or 3, n is 1 or 2 and o is an integer between 5 and 30.

The aluminium compounds of the formulas (I)–(III) mentioned above are especially suitable as components (c) when the transition metal compound is a π-cyclopentadiene complex. Since aluminium oxane is a spontaneous reaction product of an alkylaluminium compound and water, mixtures of the organoaluminic compounds of the formulas (I)–(III) can also be used with transition metal compound (a), as well as mixtures of these compounds and other substances, such as activators. It is also preferable to use more of aluminium than of the transition metal of the transition metal compound. The atomic relation Al/transition metal can as broadest be between 1:1 and $10^8$:1. In practice, however, the relation is between 10:1 and $10^5$:1, more preferably between 20:1 and 1000:1 and most preferably between 50:1 and 1000:1.

As mentioned above, the olefin polymerization catalyst system of the invention comprises a transition metal's reaction product that was obtained by contacting the transition metal compound with an unsaturated organic compound and preferably also with the organoaluminic compound discussed above. Since the idea of the invention is based on the treatment of a homogenous catalyst or catalyst system in solution with a small amount of unsaturated organic compound, it is clear that the invention in its broadest sense relates to all transition metal compounds soluble in organic compounds and active as polymerization catalysts as component (a). Homogenous Ziegler-Natta catalyst systems useful for the invention can roughly be grouped into homogenous Ziegler-Natta catalyst systems based on alkyl aluminium cocatalysts and/or aluminoxane cocatalysts and in one component catalysts based on homogenous cationic metallocene. See Reddy, S. S. and Siwaram, S., *Prog. Polym. Sci.* 20 (1995), pp. 312–321.

The scope of the invention includes alkylaluminium based homogenous catalyst systems that have compounds of titanium, vanadium, chromium or nickel as the transition metal compound. See S. M. Pillai et al., *Chem. Rev.* 86 (1986), p. 353, which is included herein by reference. The most important of these homogenous catalyst systems are the systems based on a vanadinium compound and alkyl aluminium, and they are used for the homo- and copolymerization of propene and higher α-olefins.

Another main group of transition metal compounds of homogenous Ziegler-Natta catalyst systems is comprised of metallocenes. Transition metal compounds (a) based on metallocenes are preferable, and among them, π-cyclopentadiene complexes are especially preferable. π-cyclopentadiene complexes are comprised of at least one π-cyclopentadienyl ligand co-ordinated with a transition metal, one which is preferably a metal from periods 4–6 and group 4 of the Periodic Table, quite especially titanium or zirconium. These metallocenes are best suitable with the organoaluminium compounds of formulas (I)–(III) above. In this case, the Al/transition metal (Ti, Zr) atomic ratio is often the above-mentioned relation, where an excess of aluminium is used.

As another type of homogenous catalysts used as initial material in the catalyst system of the invention, cationic metallocene based one-component catalysts were mentioned above. They have a similar metallocene structure as aluminium-based catalyst systems have, but instead of an aluminium compound, they comprise new activators and cocatalysts, of which the boranes are the most important. A typical metallocene based one-component catalyst uses as cocatalyst/activator, for example, borotriperfluorophenyl, tributylamine and borotetraalkylphenyl combination, borotriphenyl and the compound $C_2B_9H_{13}$. These metallocene compounds, which are useful for the invention, have been described in, i.e., specifications WO-95/14044, WO-94/03506, WO-92/05208 and U.S. Pat. No. 5,347,024, which are hereby included herein as references.

The π-cyclopentadiene transition metal complex of both aluminiumless and aluminium-containing metallocene catalyst systems can be represented by the general formula (IV)

$$[R'_a Cp_x Y_y MX_z^{+q}]_r [A^{-u}]_t \qquad (IV),$$

where: each Cp is independently a group comprising an M-bonded, substituted or unsubstituted, fused or non-fused, cyclopentadienyl ring, in which optionally at least one of the ring carbons has been substituted with a heteroatom from periods 2–5 and groups 13–16 of the Periodic Table; Y is a group containing an M-bound atom from periods 2–5 and groups 13–16 of the Periodic Table; each R' is independently a bridging group having 1–6 backbone carbon atoms and/or backbone heteroatoms chosen from periods 2–5 and groups 13–16 of the Periodic Table, linking two Cp groups and/or one Cp group and one Y group; M is a transition metal from periods 4–7 and groups 3–10 of the Periodic Table; each X is independently a univalent inorganic atom, group or ligand or organic group or ligand, or two X can together form a divalent ligand; a is 0, 1 or 2; x is 1, 2 or 3; y is 0 or 1; x+y is 2 or 3; q is 0 or 1; z is [valency of M]-x-y-z; r is 1 or 2; A is an anion; t is 0 or 1; u is 1 or 2 and r·q=t·u.

Thus the formula (IV) is expressed such that it comprises both the ionic and nonionic π-cyclopentadiene complexes of the transition metal.

As was mentioned above, the transition metal M of the formula (IV) is preferably a metal chosen from the periods 4–7 and the group 4, i.e. a metal of the titanium group. The most preferable metals of the titanium group are titanium and zirconium. A preferable group Cp of the formula (IV) is chosen from substituted or unsubstituted cyclopentadienyl, indenyl, benzoindenyl and fluorenyl, whereas group R' is preferably chosen from bridging groups having 1–3 carbon or silicon backbone atoms.

The group Y of the formula (IV) is preferably a group that comprises a nitrogen bonded to metal M. X is preferably chosen from the following: halogen; hydrocarbon group or hydrocarbon ligand; organic silyl, amido, phosphido or oxy group; preferably a halogene and a hydrocarbon group or hydrocarbon ligand.

As examples of metallocenes useful in the invention, the following compounds should be mentioned: bis-cyclopentadienyl zirconium dichloride, bis-cyclopentadienyl zirconium dimethyl, bis-cyclopentadienyl zirconium diphenyl, bis-cyclopentadienyl dibenzyl, bis-cyclopentadienyl zirconium bistrimethylsilyl, bis-(methylcyclopentadienyl)zirconium dichloride, bis(1,3-dimethylcyclopentadienyl)zirconium dichloride, bis-(1,2,4-trimethyl cyclopentadienyl)zirconiumchloride, bis(1,2,3-trimethyl cyclopentadienyl)zirconium dichloride, bis (pentamethyl cyclopentadienyl)zirconium dichloride, bis-indenyl zirconium dichloride, diphenyl methylen(9-fluorenyl)(cyclopentadienyl)zirconium dichloride, isopropylidene(9-fluorenyl)(cyclopentadienyl)zirconium dichloride, dimethylsilyl-bis-1-tetrahydroindenyl zirconium dichloride, dimethyl-silyl-bis-1-(2-methyl tetrahydroindenyl)zirconiumdichloride, dimethyl silyl-bis-1-(2,3,5-trimethyl cyclopentadienyl)zirconium dichloride, dimethyl silyl-bis-1-(2,3,5-trimethyl cyclopentadienyl) zirconium chloride, dimethyl silyl-bis-1-(2,4-dimethyl cyclopentadienyl)zirconiumdichloride, dimethylsilyl-bis-1-indenyl zirconiumdichloride, dimethyl silyl-bis-1-indenyl zirconium dimethyl, dimethyl germyl-bis-1-indenyl zirconiumdicloride, dimethylsilyl-bis-1-(2-methyl-indenyl) zirconium dichloride, dimethyl-bis-1-(2-methyl-4-isopropyl-indenyl)zirconiumdichloride, phenylmethylsilyl-bis-1-(2-methyl-indenyl)zirconiumdichloride, dimethyl silyl-bis-1-(2-methyl-4-ethyl-indenyl)zirconiumdichloride, ethylene-bis-1-(4,7-dimethyl-indenyl)zirconiumdichloride, phenyl(methyl)silyl-bis-1-indenyl zirconium dichloride, phenyl(vinyl)silyl-bis-1-indenyl zirconiumdichloride, diphenyl silyl-bis-1-indenyl zirconium dichloride, di-methyl silyl-bis-(1-(2-methyl-4-tertiarbutyl-indenyl)) zirconiumdichloride, methylphenylsilyl-bis-(1-(2-methyl-4-isopropyl-indenyl))zirconiumdichloride, dimethylsilyl-bis-(1-(2-ethyl-4-methyl-indenyl))zirconium chloride, dimethyl silyl-bis-(1-(2,4-dimethyl-indenyl))zirconiumdichloride, dimethyl silyl-bis-(1-(2-methyl-4-ethyl-indenyl)) zirconiumdimethyl, dimethylsilyl-bis-(2-methyl-4,6-di-isopropyl-indenyl)zirconiumdichloride, dimethylsilyl-bis-(2,4,6-trimethylindenyl)zirconiumdichloride, methylphenylsilyl-bis-(2-methyl-4,6-di-isopropyl-indenyl) zirconiumdichloride, 1,2-ethanediyl-bis-(2-methyl-4,6-diisopropyl-indenyl)zirconiumdichloride and dimethyl silyl-bis-(2-methyl-4,5-benzoindenyl)zirconiumchloride.

Other metallocene compounds useful in the present invention have been mentioned, for example, in specifications WO-94/28034, EP-A1-0 650 973, EP-A1-0 545 152, EP-A1-0 567 952, EP-A1-0 659 756, WO-95/14044, WO-95/00562, WO-94/03506, WO-95/04761 and WO-92/05208, which specifications are included here by reference to describe homogenous transition metal compounds useful for the invention and homogenous systems formed by them.

The idea of the invention is based on that the transition metal compound and the optional organoaluminium compound are, in an organic solvent, treated with a little amount of an unsaturated organic compound. It is obvious that choosing the organic compound is a routine task for people skilled in the art. The only requirement for the organic solvent is that it should together with the transition metal compound, unsaturated organic compound and the optional organoaluminium compound, form a system that is soluble in the beginning or after the reaction, and that it (the organic solvent) is removable by evaporation after the contacting stage, if a solid catalyst system is desired. It is obvious that the organic solvent must not take part in the reaction and that "organic solvent" is not e.g. an electron donor compound, though these can be separately added. Reaction components (a), (b) and (c) do not all need to be soluble, as long as they form a soluble product.

In one embodiment, the organic solvent used in the production of the reaction product of the transition metal of the olefin polymerization catalyst system of the invention is a liquid hydrocarbon or a mixture of hydrocarbons. A preferable liquid hydrocarbon is an aromatic $C_6$–$C_{12}$-hydrocarbon and/or aliphatic $C_{5-12}$-hydrocarbon or a mixture of them. For examples of suitable solvents, it is worth mentioning toluene, diesel oil, heptane, hexane, benzene and their mixtures. Aromatic solvents are suitable in that conventional alumoxanes are quite soluble in them.

When the reaction product of the transition metal compound of the polymerization catalyst system of the invention is produced by bringing into contact in stage (I) at least the transition metal compound (a), the unsaturated organic compound (b), and optionally the reaction product (c) of an organoaluminium compound, these compounds and the organic solvent used in this stage, can be brought into contact with each other in any sequence. A preferable sequence is: [(a)+(c)]+(b)]. Other compounds such as activators of the initial homogenous catalyst system, different types of electron donors and substances for controlling the viscosity of the solution can be added.

When the olefin polymerization catalyst system of the invention is produced, the reaction product of its transition metal compound is produced by bringing into contact in organic solvent the transition metal compound, a little amount of the unsaturated organic compound and optionally an organoaluminium compound, after which, in the second stage i.e. stage (II), the reaction product of the said components is recovered.

According to one embodiment of the invention, stage (II) is carried out by recovering the transtion compound's reaction product in solution. This refers to recovering the product either as the product of the stage (I) of the production process or as separately dissolved in a suitable solvent, which can either be the same as the solvent used in the production process or not.

According to another embodiment of the invention, stage (II) is carried out by bringing into contact the transition metal's reaction product dissolved in an organic solvent and a solid carrier, to recover a solid contact product by removing the solvent at least partially by evaporation and optionally by prepolymerizing the solid contact product finally with one or more olefin monomers, to yield the transition metal's solid reaction product, which is optionally prepolymerized.

In this embodiment the transition metal's reaction product is thus formed from a solid carrier (support material), on the surface of which the reaction product of the transition metal compound (a) with the unsaturated organic compound (b) and possibly with the organoaluminium compound (c) has been impregnated. Thus it differs essentially from a system, in which the carrier is first impregnated with the transition metal compound and possibly with an organoaluminium compound and where the impregnate obtained is then used as prepolymerization catalyst.

As mentioned above, reacting the transition metal compound, unsaturated organic compound and possible organoaluminium compound before the impregnation changes the impregnation solution so that the catalyst is more stable and active. The impregnation product of the invention can, nevertheless, be prepolymerized if necessary, to adjust the morphology and improve the processability.

In case the reaction product, dissolved in an organic solvent and obtained from stage (I), is brought into contact with a solid carrier, the latter can be any catalyst activity preserving particle-formed substance. In an embodiment, the solid carrier is porous particle-formed material, such as talc, inorganic oxide or mixture of oxides, an inorganic salt or mixture of salts, resin, etc., preferably an inorganic oxide of a metal from periods 1–6 and groups 2, 3, 4, 14 and 14, most preferably, silica, alumina, silico-alumina or their mixture with magnesia, titania or zirconia. Of the inorganic salts, magnesium chloride and its mixed salts and mixtures can be mentioned.

Mentioned above are embodiments, in which stage II is carried out by recovering the solution itself or by letting the carrier absorb the reaction product of stage (I), which is dissolved in an organic solvent. However, there is in addition a third important embodiment of the invention, in which stage (II) is carried out either by evaporating the solvent from the transition metal's reaction product dissolved in an organic solvent or precipitating the reaction product from its solution in the organic solvent and by recovering the reaction product in solid state and optionally by prepolymerizing the reaction product, which is in solid state, whereupon a solid transition metal reaction product is obtained, which can optionally be prepolymerized. This is also a novel product, because the solid reaction product obtained by evaporating the solvent contains a reaction product of the transition metal compound (a) and an unsaturated organic compound (c). Thus the reaction product is not a prepolymer.

Apart from that the present invention relates to an olefin polymerizing catalyst system which comprises a solid reaction product produced in the way described above, the invention also relates to the above-described method for the production of a solid reaction product of the polymerizing catalyst system of olefins. All the chararacteristics described above in connection with the description of the product are also adequate for the production method for the solid reaction product of the polymerization catalyst system of the invention.

The invention also relates to a method for polymerizing olefins by polymerizing one or more olefins by an olefin polymerizing catalyst system comprising a solid reaction product. Similar polymerizing methods, but lacking without the special characteristics of the present invention, have been disclosed in, among others, specifications WO-94/28034, EP-A1-0 545 152, EP-A2-0 523 416, EP-A1 0567 952, WO-95/14044, WO-94/03506, WO-93/23439, WO-95/10542, WO-95/04761, WO-87/02991, EP-A1-0 586 167 and DE-A1-42 42 486, which are included here by reference.

These methods differ from each others mainly in reactive components and the sequence of adding monomers. What they all have in common, however, is that the initial stage of the polymerization, i.e. the initiation, is not carried out separately or until the catalyst system has been solidified.

The disadvantages of the above-mentioned specifications are manifested as a rapid decrease of the activity if the prepolymerization is not carried out immediately and as a lower activity, if the catalyst particles are coated with a layer of prepolymer.

The objective of the olefin polymerization method of the present invention is to remedy the above-mentioned disadvantages and to produce a stable and active polymerization catalyst system that comprises a reaction product of a transition metal. This objective has now been achieved by the novel polymerization method, which is based on that olefins are polymerized, i.e., homopolymerized or copolymerized, using a polymerization catalyst system, in which the reaction product of the transition metal compound is obtained by a method comprising the following sequence:

(I) bringing into contact in an organic solvent, the following reactive components
  (a) a transition metal compound which is at least partially soluble in the organic solvent and contains in its molecule at least one organic group and a transition metal chosen from periods 4–7 and groups 3–10 of the Periodic Table (IUPAC 1990), and
  (b) 0.05–500 moles of unsaturated organic compound per mole of transition metal of a transition metal compound, where the unsaturated organic compound is at least partially soluble in the organic solvent and includes in its molecule 2–30 carbon atoms and at least one terminal double bond,
  to obtain a reaction product dissolved in the organic solvent;
(II) recovering the reaction product of the transition metal compound.

It is seen that the polymerization method of the invention is based on the same inventive idea that has been disclosed above in connection with the description of the olefin polymerization catalyst system and the method of producing it. Thus also the specifications and the descriptions of the alternative and preferred embodiments and their optimal parameters are adequate for this polymerization method. Here we refer in this connection to the descriptions of the olefin polymerization catalyst system and its production method.

It is very important to note that even though the transition metal compound, the unsaturated organic compound and the possible organoaluminium compound are described as being at least partially soluble in the said organic solvent, the invention also relates to cases in which one or more of the said components are as such either insoluble or sparingly soluble in the said organic solvent, and as they are brought into contact with the said organic solvent and react with other components, they form a product soluble in organic solvent. Thus the protection intended by the patent described above cannot be circumvented by using a sparingly soluble or insoluble transition metal compound, an unsaturated organic compound and a possible organoaluminium compound, because the patent in its broadest sense protects all embodiments in which a soluble preinitiated transition metal compound is produced.

It is also clear that the concentrations of transition metal compound (a), unsaturated organic compound (b) and possible organoaluminic compound (c) in an organic solvent can vary within the limits of solubility, and a person skilled in the art can easily optimize them so that an initiation product as stable and active as possible is created.

It is also clear that the olefin polymerization method of the present invention works with both soluble, mere solid and prepolymerized solid catalyst system.

In a typical polymerization of the invention, a $C_5$–$C_{15}$-hydrocarbon, preferably alkane, is used as the medium. In a polymerization solution, the transition metal concentration is usually in the range of about 0.01–0.10% of the total weight of the polymerization mixture, and if an organoaluminium compound is used, the aluminium concentration is usually in the range of about 1–50% of the total weight of the polymerization mixture.

The size of particles used in the polymerization is usually in the range of about 10–400 $\mu$m, more preferably about 30–100 $\mu$m. This preferable particle size also concerns the solid reaction product of the olefin polymerization catalyst system of the invention and its production method.

The polymerization, which can be carried out as mass polymerization, suspension polymerization, solution polymerization or gas phase polymerization, occurs at a very wide range of temperatures. A favourable range in both the prepolymerization and the actual polymerization is between −80 and +300° C., preferably between −50 and +100° C. The process can be with or without pressure.

It can be claimed that if the same compound that was used for the preinitiation is used as the monomer, the invention described above is implicitly realized in all homogenous polymerizations. This, however, is not the case, because the growth stage of the polymerization is so rapid that this catalyst system is not able to emerge in homogenous polymerizations. Thus the polymerization of the above invention always requires a separate catalyst system of the invention to be prepared in a stable form before the polymerization.

Ethylene, propene, 1-butene, isobutene, 4-methyl-1-pentene, 3-methyl-1-butene, 4,4-dimethyl-1-pentene or vinylcyclohexane are preferable monomers in the polymerization method of the invention. Also polymerization of cyclic monomers such as cyclopentadiene and norbornene can be performed. The invention also relates to copolymerization of olefins with other olefins or other monomers.

The invention also relates to a process for the stabilization of a homonogenous olefin polymerization catalyst system comprising a transition metal compound and being characterized in that it is comprised of:

(I) bringing into contact in an organic solvent the following reactive components
  (a) a transistion metal compound, which is at least partially soluble in the organic solvent and contains in its molecule at least one organic group and a transition metal chosen from periods 4–7 and groups 3–10 of the Periodic Table (IUPAC 1990), and
  (b) 0.05–500 moles of an unsaturated organic compound per mole of transition metal of the transition metal compound, which unsaturated organic compound is at least partially soluble in the organic solvent, has in its molecule 2–30 carbon atoms and at least one double bond, to obtain a reaction product dissolved in the organic solvent; and
(II) recovering the reaction product as part of the homogenous olefin polymerization catalyst system.

Some examples will be presented in the following. Their sole purpose is to illustrate the invention.

EXAMPLES

Preparing the Catalyst

Example 1

A complex of metallocene and metylalumoxane (MAO) was first prepared by solving 22.2 mg (0.055 mmol) bis(n- butyl-cyclopentadienyl)zirconiumdichloride in 2.4 m$^3$ of toluen solution of 30% MAO (13.7% Al). The mixture was stirred for half an hour at room temperature. The complex obtained was treated with a mixture of vinylcyclohexane (0.04 cm$^3$) and toluene (0.53 cm$^3$) by adding the mixture in the complex solution at room temperature and stirring half an hour. The vinylcyclohexane-treated complex solution thus obtained was impregnated on a silica carrier using 1.5 cm$^3$ of the complex per 1 g of silica. The silica had been calcified in nitrogen at 600° C. for 4 hours. The volume of the complex, 1.5 cm$^3$/g of silica did not exceed the total volume of the pores in the silica. After stirring an hour, the catalyst was dried using nitrogen flow at room temperature for 1 hour.

Reference Example 1

The catalyst was prepared as in example 1, but vinylcyclohexane was not used and the toluene amount was 0.60 cm$^3$.

Example 2

The catalyst was prepared as in example 1, but 0.055 mmol rac-dimetylsilyl-bis(1-indenyl)zirconiumchloride was used as the metallocene compound.

Reference Example 2

The catalyst was prepared as in example 2, but vinylcyclohexane was not used.

Example 3

The catalyst was prepared as in example 1, but the amount of vinylcyclohexane was two times bigger.

Polymerizations

Polymerizations were carried out in a 3 dm$^3$ steel autoclave in which there was a stirrer. 1.8 dm$^3$ of isobutane was fed into the reactor, which had been dried and flushed with nitrogen, and the catalyst was fed to the isobutane using nitrogen. The temperature of the reactor was raised to 80° C., and ethylene and 40 ml 1-hexene, which functioned as comonomer, were continuosly fed to the reactor. The total pressure in the reactor was ajusted such that the partial pressure of ethylene in the reactor was 5 bar. The total pressure was maintained constant by feeding ethylene constantly into the reactor. The polymerizations were carried out at 80° C. for 60 minutes. Polymerization results for the catalysts mentioned above are presented in Table I, examples 8–16. The amount (mg) of the catalyst used, the amount of ethylene-hexene copolymer created, the activity per gram of catalyst per hour, melt flow rate, melt flow ratio, the polymer's comonomer concentration and density are presented in the table.

Results

The results show that when vinylcyclohexane was used for treating the catalyst in the examples 1 and 2, the catalysts activity was improved by 15% and 114%, respectively. The result is notable.

TABLE I

Polymerization results

| Ex. Nr. | Cat. ex. | mass of cat./mg | Olefin type | Ol/Zr mol/mol | Yield g PO | Act. | Melt flow MFR(2) | Melt flow ratio FRR(21/2) | Hexene weight % | Density |
|---|---|---|---|---|---|---|---|---|---|---|
| 8 | R. 1 | 155 | — | — | 459 | 2.96 | 2.98 | 16.0 | 3.76 | n.m. |
| 9 | Ex 1 | 120 | VCH | 5 | 528 | 4.40 | 3.51 | 15.3 | 3.39 | 932.7 |
| 10 | R. 2 | 107 | — | — | 44 | 0.41 | n.m. | n.m. | 6.70 | n.m. |
| 11 | Ex 2 | 125 | VCH | 5 | 94 | 0.75 | n.m | n.m. | 9.12 | n.m. |
| 12 | Ex 3 | 106 | VCH | 15 | 441 | 4.16 | 3.36 | 15.8 | 3.34 | 930.8 |
| 13 | Ex 4 | 107 | VCH | 75 | 282 | 2.64 | 3.00 | 16.8 | 3.00 | 933.2 |
| 14 | Ex 5 | 115 | 1-hexene | 6 | 471 | 4.10 | 3.43 | 15.4 | 3.06 | 930.7 |
| 15 | Ex 6 | 125 | VTMS | 5 | 527 | 4.22 | 3.17 | 15.9 | n.m. | n.m. |
| 16 | Ex 7 | 126 | VTMS | 5 | 61 | 0.51 | n.m. | n.m | n.m. | n.m. |

VCH = vinylcyclohexene,
VTMS = vinyltrimethylsilane
n.m. = not measured,
Act. = activity kg/g(cat.)/h
R. = Reference example

Example 4

The catalyst was prepared as in example 1, but the amount of vinylcyclohexane was 14 times bigger.

Example 5

The catalyst was prepared as in example 1, but instead of vinylcyclohexane, 1-hexene was used.

Example 6

The catalyst was prepared as in example 1, but instead of vinylcyclohexane, vinyltrimethylsilane was used.

Example 7

The catalyst was prepared as in example 2, but instead of vinylcyclohexane, vinyltrimethylsilane was used.

Example 17

The catalysts were prepared in the same way as in the previous examples, dissolving at room temperature, 15 mg of rac-Me$_2$Si(indenyl)$_2$ZrCl$_2$ in 1.5 ml of 30% methylalumoxane in toluene (Albermarle) and kept at room temperature for 30 min. The preinitiating olefin is then added under mixing and the clear solution is kept at room temperature for 60 min after which it is added dropwise to 1.5 g of Grace silica 55SJ. The solution is instantly filling the pores of the silica giving a dry free flowing powder at all times. The material is stored for 30 min at room temperature after which the toluene is evaporated by a flow of dry oxygen free nitrogen at ambient temperature over a period of 1 hr., giving a dry free flowing material.

Example 18

Dissolving at room temperature, 15 mg of rac-Me$_2$Si (indenyl)$_2$ZrCl$_2$ in 1.5 ml of 30% methylalumoxane in toluene (Albermarle) and kept at room temperature for 90 min after which it is added dropwise to 1.5 g of Grace silica 55SJ. The solution is instantly filling the pores of the silica giving a free flowing powder at all times. The material is stored for 30 min at room temperature after which the toluene is evaporated by a flow of dry and oxygen free nitrogen at ambient temperature over a period of 1 hr., giving a dry free flowing material.

Example 19

The catalyst was prepared in same way as in previous examples, dissolving at room temperature, 15 mg of rac-Me$_2$Si(2-Me-4,5-benzindenyl)$_2$ZrCl$_2$ in 1.5 ml of 30% methylalumoxane in toluene (Albermarle) and kept at room temperature for 30 min. The preinitiating olefin is then added under mixing and the clear solution is kept at room temperature for 60 min after which it is added dropwise to 1.5 g of Grace silica 55SJ. The solution is instantly filling the pores of the silica giving a dry free flowing powder at all times. The material is stored for 30 min at room temperature after which the toluene is evaporated by a flow of dry oxygen free nitrogen at ambient temperature over a period of 1 hr., giving a dry free flowing material.

Example 20

Dissolving at room temperature, 15 mg of rac-Me$_2$Si(2-Me-4,5-benzindenyl)$_2$ZrCl$_2$ in 1.5 ml of 30% methylalumoxane in toluene (Albermarle) and kept at room temperature for 90 min after which it is added dropwise to 1.5 g of Grace silica 55SJ. The solution is instantly filling the pores of the silica giving a free flowing powder at all times. The material is stored for 30 min at room temperature after which the toluene is evaporated by a flow of dry and oxygen free nitrogen at ambient temperature over a period of 1 hr., giving a dry free flowing material.

Test Polymerization Procedure for Polypropylene

Polymerizations were performed in bulk propene in a 2 l steel reactor at 70° C. with 5 min. prepolymerization at 10° C. Hydrogen was added with a partial pressure of 0.03 bar as chain transfer agent.

What is claimed is:
1. An olefin polymerization catalyst system comprising a reaction product of a transition metal compound obtained by a process comprising the sequential steps of:
   (I) contacting in an organic solvent the following reactive components to obtain a reaction product dissolved in the organic solvent
      (a) a transition metal compound, wherein said transition metal compound is at least partially soluble in the organic solvent and contains in its molecule at least one organic group and a transition metal chosen from periods 4–7 and groups 3–10 of the Periodic Table, and
      (b) 0.05–500 moles of an unsaturated organic compound per mole of transition metal of the transition metal compound, wherein said unsaturated organic compound is at least partially soluble in the organic solvent and is an unsaturated 3- or 4-branched 1-alkene or a 1-unsaturated silane having in their molecule 2–30 carbon atoms and at least one double bond; and
   (II) recovering the reaction product of a transition metal compound.
2. The olefin polymerization catalyst system according to claim 1, wherein the molar ratio between the unsaturated organic compound (b) and the transition metal of the transition metal compound (a) is between 1 and 10.
3. The olefin polymerization catalyst system according to claim 1 or 2, wherein the unsaturated organic compound (b) is vinylcyclohexane, allylcyclohexane, 3,3-dimethyl-1-butene, 4,4-dimethyl-1-pentene, vinyltrimethylsilane, allyltrimethylsilane, vinyltriethylsilane, allyltriethylsilane, vinyltriisopropylsilane, allyltriisopropylsilane, vinyltriphenylsilane, allyltriphenylsilane.
4. The olefin polymerization catalyst system according to claim 1, wherein said reaction product is obtained by contacting in step (I) in an organic solvent components (a) and (b) and the following component
   (c) an organometallic aluminium compound which is soluble in the organic solvent.
5. The olefin polymerization catalyst system according to claim 4, wherein the organoaluminium compound (c) is chosen from soluble alkyl aluminium compounds of the general formula (I):

$$(R_mAlX_{3-m})_n \qquad (I)$$

or unmodified or modified alumoxane compounds of the general formula (II) or (III):

TABLE II

| Catalyst | Racemic metallocene | Preinitiation olefin used | Amount pre-initiation olefin Olefin/Zr, mol/mol | Al/Zr ratio in catalyst mol/mol | Activity polymerization g PP/g.cat.h | MFR (2, 16) |
|---|---|---|---|---|---|---|
| 17 | Ethylene(indenyl)$_2$ZrCl$_2$ | Vinylcyclohexene | 5 | 250 | 1578 | >1000 |
| 18 | Ethylene(indenyl)$_2$ZrCl$_2$ | — | — | 250 | 830 | >1000 |
| 19 | Me$_2$Si(2-Me-4,5-benzindenyl)$_2$ZrCl$_2$ | Vinylcyclohexene | 6 | 200 | 5300 | 15 |
| 20 | Me$_2$Si(2-Me-4,5-benzindenyl)$_2$ZrCl$_2$ | — | — | 200 | 2870 | 4.1 |

Cat = Dry product from catalyst preparation containing metallocene, methyl-alumoxane, silica support and optionally preinitiation olefin reaction product

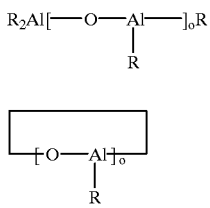

(II)

(III)

wherein each R is independently a $C_1$–$C_4$-alkyl group, X is a halogen, m is 1, 2, or 3, n is 1 or 2, and o is an integer between 5 and 30.

6. The olefin polymerization catalyst system according to claim 1 wherein the transition metal compound (a) is a π-cyclopentadiene complex of a transition metal.

7. The olefin polymerization catalyst system according to claim 6 wherein the π-cyclopentadiene complex of a transition metal is a compound having the general formula (IV):

$$[R'_a Cp_x Y_y MX_z^{+q}]_t [A^{-u}]_t \quad (IV)$$

wherein: M is a transition metal chosen from periods 4–7 and groups 3–10 of the Periodic Table; each Cp is independently a group comprising an M-bound, substituted or unsubstituted, fused or non-fused, cyclopentadienyl ring which optionally has at least one of its ring carbons replaced by a heteroatom chosen from periods 2–5 and groups 13–16 of the Periodic Table; Y is a group containing a M-bound nitrogen atom; each R' is independently a bridging group having 1–6 carbon atoms and/or backbone heteroatoms chosen from periods 2–5 and groups 13–16 of the Periodic Table, linking two Cp groups and/or one Cp group and one Y group; each X is independently an univalent anionic inorganic atom, group or ligand or organic group or ligand, or two X may together form a divalent ligand; a is 0, 1 or 2; x is 1, 2 or 3; y is 0 or 1; x+y is 2 or 3; q is 0 or 1; z is equal to the valence of M minus the sum of x, y, and q; r is 1 or 2; A is an anion; t is 0 or 1; a is I or 2 and r·q=t·u.

8. The olefin polymerization catalyst system according to claim 7 wherein the transition metal M is a metal chosen from periods 4–6 and group 4 of the Periodic Table.

9. The olefin polymerization catalyst system according to claim 7 or 8, wherein the group Cp is chosen from substituted or unsubstituted, bridged or unbridged cyclopentadienyl, indenyl, benzoindenyl, fluorenyl, and benzofluorenyl.

10. The olefin polymerization catalyst system according to claim 7, wherein the group R' is chosen from bridging groups having 1–3 carbon or silicon backbone atoms.

11. The olefin polymerization catalyst system according to claim 7, wherein X is chosen from: a halogen; a hydrocarbyl group or ligand; an organic silyl, amido, phosphido, and oxy group.

12. The olefin polymerization catalyst system according to claim 1 wherein the organic solvent is an aromatic $C_6$ to $C_{12}$ hydrocarbon and/or an aliphatic $C_5$ to $C_{12}$ hydrocarbon or a mixture thereof.

13. The olefin polymerization system according to claim 1 wherein step (II) has been performed by recovering the reaction product of a transition metal compound in the form of a solution.

14. The olefin polymerization catalyst system according to claim 1 wherein step (II) has been performed by contacting the reaction product of a transition metal compound dissolved in the organic solvent with a solid support medium to give a solid contacting product.

15. The olefin polymerization catalyst system according to claim 14 wherein the solid contacting product is recovered by removing the solvent at least partially by evaporation, and the recovered solid contacting product is optionally prepolymerized with one or more olefinic monomers, to yield a solid reaction product of a transition metal compound, which is optionally prepolymerized.

16. The olefin polymerization catalyst system according to claim 14 or 15 wherein the solid support medium is a porous particulate material, an inorganic oxide or oxide mixture, an inorganic salt or salt mixture, or a resin.

17. The olefin polymerization catalyst system according to claim 1, wherein step (II) has been performed by evaporating the solvent from the reaction product dissolved in the organic solvent or precipitating the reaction product from its solution in the organic solvent, and recovering the reaction product in solid form, and prepolymerizing the recovered reaction product of a transition metal compound in solid form, to yield a solid reaction product of a transition metal compound, which is prepolymerized.

18. In a process for the polymerization of olefins by polymerizing one or more olefins in the presence of an olefin polymerization catalyst system, the improvement which comprises employing as said olefin polymerization catalyst system a reaction product of a transition metal compound obtained by a process comprising the sequential steps of:

(I) contacting in an organic solvent the following reactive components to obtain a reaction product dissolved in the organic solvent
   (a) a transition metal compound, wherein said transition metal compound is at least partially soluble in the organic solvent and contains in its molecule at least one organic group and a transition metal chosen from periods 4–7 and groups 3–10 of the Periodic Table, and
   (b) 0.05–500 moles of an unsaturated organic compound per mole of transition metal of the transition metal compound, wherein said unsaturated organic compound is at least partially soluble in the organic solvent and is an unsaturated 3- or 4-branched 1-alkene or a 1-unsaturated silane having in their molecule 2–30 carbon atoms and at least one double bond; and (II) recovering the reaction product of a transition metal compound.

19. The process for the polymerization of olefins according to claim 18, wherein the molar ratio between the ethylenically unsaturated organic compound (b) and the transition metal of the transition metal compound (a) is between 1 and 10.

20. The process for the polymerization of olefins according to claim 18 or 19, wherein the unsaturated organic compound (b) is vinylcyclohexane, allylcyclohexane, 3,3-dimethyl-1-butene, 4,4-dimethyl-1-pentene, vinyltrimethylsilane, allyltrimethylsilane, vinyltriethylsilane, allyltriethylsilane, vinyltriisopropylsilane, allyltriisopropylsilane, vinyltrnphenylsilane, or allyltriphenylsilane.

21. A process for the polymerization of olefins according to claim 18, wherein said reaction product is obtained by contacting in step (I) in an organic solvent components (a) and (b) and the following component:
   (c) a organometallic aluminium compound which is soluble in the organic solvent.

22. The process for the polymerization of olefins according to claim 21, wherein the dissolved organoaluminium compound (c) is chosen from alkyl aluminium compounds of the general formula (I):

  (I)

or unmodified or modified alumoxane compounds of the general formula (II) or (III):

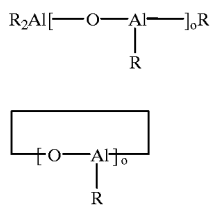

wherein each R is independently a $C_1$–$C_4$-alkyl group, X is a halogen, m is 1, 2, or 3, n is 1 or 2, and o is an integer between 5 and 30.

23. The process for the polymerization of olefins according to claim 18 wherein the transition metal compound (a) is a π-cyclopentadiene complex of a transition metal.

24. The process for the polymerization of olefins according to claim 18 wherein the π-cyclopentadiene complex of a transition metal is a compound having the general formula (IV):

  (IV)

wherein: M is a transition metal chosen from periods 4–7 and groups 3–10 of the Periodic Table; each Cp is independently a group comprising an M-bound, substituted or unsubstituted, fused or non-fused, cyclopentadienyl ring which optionally has at least one of its ring carbons replaced by a heteroatom chosen from periods 2–5 and groups 13–16 of the Periodic Table; Y is a group containing an M-bound nitrogen atom; each R' is independently a bridging group having 1–6 carbon atoms and/or backbone heteroatoms chosen from periods 2–5 and groups 13–16 of the Periodic Table, linking two Cp groups and/or one Cp group and one Y group; each X is independently a univalent anionic inorganic atom, group or ligand, or organic group or ligand, or two X may together form a divalent ligand; a is 0, 1 or 2; x is 1, 2 or 3; y is 0 or 1; x+y is 2 or 3; q is 0 or 1; z is equal to the valence of M minus the sum of x, y, and q; r is 1 or 2; A is an anion; t is 0 or 1; a is 1 or 2 and r·q=t·u.

25. The process for the polymerization of olefins according to claim 24, wherein the transition metal is chosen from periods 4 to 6 and group 4 of the Periodic Table.

26. The process for the polymerization of olefins according to claim 24 or 25, wherein the group Cp is chosen from substituted or unsubstituted, bridged or unbridged cyclopentadienyl, indenyl, benzoindenyl, fluorenyl, and benzofluorenyl.

27. The process for the polymerization of olefins according to claim 24, wherein the group R' is chosen from a bridging group having 1–3 carbon or silicon backbone atoms.

28. The process for the polymerization of olefins according to claim 24, wherein X is chosen from: a halogen; a hydrocarbyl group or ligand; an organic silyl, amido, phosphido, and oxy group.

29. The process for the polymerization of olefins according to claim 18, wherein the organic solvent is an aromatic $C_6$ to $C_{12}$ hydrocarbon and/or an aliphatic $C_5$ to $C_{12}$ hydrocarbon or a mixture thereof.

30. The process for the polymerization of olefins according to claim 18, wherein step (II) has been performed by recovering the reaction product of a transition metal compound in the form of a solution.

31. The process for the polymerization of olefins according to claim 18, wherein step (II) has been performed by contacting the reaction product of a transition metal compound dissolved in the organic solvent with a solid support medium to give a solid contacting product.

32. The process for the polymerization of olefins according to claim 31, wherein the solid contacting product is recovered by removing the solvent at least partially by evaporation, and the recovered solid contacting product is prepolymerized with one or more olefinic monomers, to yield a solid reaction product of a transition metal compound, which is prepolymerized.

33. The process for the polymerization of olefins according to claim 31 or 32, wherein the solid support medium is a porous particulate material, an inorganic oxide or oxide mixture, an inorganic salt or salt mixture, or a resin.

34. The process for the polymerization of olefins according to claim 18, wherein step (II) has been performed by evaporating the solvent from the reaction product of a transition metal compound dissolved in the organic solvent or precipitating the reaction product from its solution in the organic solvent and recovering the reaction product in solid form, and prepolymerizing the recovered reaction product in solid form, to yield a solid reaction product of a transition metal compound, which is prepolymerized.

35. A process for the stabilization of a homogenous olefin polymerization catalyst system comprising a transition metal compound comprising the sequential steps of:

(I) contacting in an organic solvent the following reactive components to obtain a reaction product dissolved in the organic solvent
 (a) a transition metal compound, wherein said transition metal compound is at least partially soluble in the organic solvent and contains in its molecule at least one organic group and a transition metal chosen from periods 4–7 and groups 3–10 of the Periodic Table, and
 (b) 0.05–500 moles of an unsaturated organic compound per mole of transition metal of the transition metal compound, wherein said unsaturated organic compound is at least partially soluble in the organic solvent and is an unsaturated 3- or 4-branched 1-alkene or a 1-unsaturated silane having in their molecule 2–30 carbon atoms and at least one terminal double bond; and (II) recovering the reaction product as part of the homogenous olefin polymerization catalyst system.

* * * * *